United States Patent
Petratos et al.

(10) Patent No.: US 10,592,677 B2
(45) Date of Patent: Mar. 17, 2020

(54) SYSTEMS AND METHODS FOR PATCHING VULNERABILITIES

(71) Applicant: PAYPAL, INC., San Jose, CA (US)

(72) Inventors: Spiros Petratos, Austin, TX (US); Rick Hogge, Liberty Hill, TX (US); Praveen Nuthulapati, Austin, TX (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 15/993,338

(22) Filed: May 30, 2018

(65) Prior Publication Data
US 2019/0370471 A1 Dec. 5, 2019

(51) Int. Cl.
*G06F 11/00* (2006.01)
*G06F 21/57* (2013.01)
(Continued)

(52) U.S. Cl.
CPC .............. *G06F 21/577* (2013.01); *G06F 8/65* (2013.01); *G06F 8/71* (2013.01); *G06F 11/3664* (2013.01); *G06F 21/554* (2013.01); *G06F 21/53* (2013.01); *G06F 21/566* (2013.01); *G06F 2221/033* (2013.01)

(58) Field of Classification Search
CPC .............. G06F 11/2007; G06F 11/3688; G06F 11/3672; G06F 9/45558; G06F 9/5072; G06F 17/30477; G06F 21/31; G06F 21/577; G06F 21/554; G06F 21/566; G06F 21/57; G06F 21/53; G06F 8/71; G06F 8/65; G06F 8/60; G06F 11/3684; G06F 11/3051; G06F 9/44521; G06F 17/30696; G06F 21/55; G06F 21/50; G06F 21/56; G06F 8/36; G06F 8/61
See application file for complete search history.

(56) References Cited

U.S. PATENT DOCUMENTS

| | | | |
|---|---|---|---|
| 7,322,024 B2 * | 1/2008 | Carlson | G06F 8/36 |
| | | | 707/999.103 |
| 8,745,746 B1 * | 6/2014 | Jain | H04L 63/145 |
| | | | 726/25 |

(Continued)

OTHER PUBLICATIONS

Frank Li et al., A Large-Scale Empirical Study of Security Patches, Oct. 30-Nov. 3, 2017, [Retrieved on Oct. 28, 2019]. Retrieved from the internet: <URL: https://dl.acm.org/citation.cfm?id=3134072> 15 Pages (2201-2215) (Year: 2017).*

(Continued)

*Primary Examiner* — Anibal Rivera
(74) *Attorney, Agent, or Firm* — Haynes and Boone LLP

(57) ABSTRACT

Techniques are disclosed for patching applications having software components with vulnerabilities. Upon receipt of a notification that a version of a software component has a vulnerability, a database of metadata is accessed to identify software applications which include the version of the software component. The identified software applications are cloned, and the version of the software component is replaced with a newer version which is free from the vulnerability to patch the application. The patched software application is then tested on a cloud computing test environment, and upon a successful test, deployed to a cloud computing production environment.

20 Claims, 10 Drawing Sheets

(51) Int. Cl.
*G06F 9/44* (2018.01)
*G06F 17/30* (2006.01)
*G06F 8/65* (2018.01)
*G06F 11/36* (2006.01)
*G06F 8/71* (2018.01)
*G06F 21/55* (2013.01)
*G06F 21/56* (2013.01)
*G06F 21/53* (2013.01)

(56) References Cited

U.S. PATENT DOCUMENTS

| | | | | |
|---|---|---|---|---|
| 8,910,278 | B2* | 12/2014 | Davne | H04L 63/0272 705/2 |
| 9,176,728 | B1* | 11/2015 | Dixit | G06F 8/71 |
| 9,195,570 | B2* | 11/2015 | Tripp | G06F 11/3672 |
| 9,256,746 | B2* | 2/2016 | Toback | G06F 21/57 |
| 9,419,857 | B1* | 8/2016 | Ryan | H04L 63/08 |
| 9,432,335 | B1* | 8/2016 | Stevenson | H04L 63/0209 |
| 9,459,860 | B2* | 10/2016 | Verde | G06F 11/0709 |
| 9,462,010 | B1* | 10/2016 | Stevenson | H04L 63/1433 |
| 9,535,685 | B1* | 1/2017 | Wang | G06F 8/65 |
| 9,589,129 | B2* | 3/2017 | Richardson | G06F 21/50 |
| 9,619,262 | B2* | 4/2017 | Sabin | G06F 9/45558 |
| 9,626,509 | B1* | 4/2017 | Khalid | G06F 21/53 |
| 2004/0088565 | A1* | 5/2004 | Norman | H04L 63/1433 726/22 |
| 2005/0005152 | A1* | 1/2005 | Singh | G06F 21/554 726/26 |
| 2005/0132206 | A1* | 6/2005 | Palliyil | G06F 21/566 713/188 |
| 2006/0265750 | A1* | 11/2006 | Huddleston | G06F 21/554 726/24 |
| 2007/0061125 | A1* | 3/2007 | Bhatt | G06F 21/577 703/20 |
| 2008/0271019 | A1* | 10/2008 | Stratton | G06F 21/577 718/1 |
| 2008/0271025 | A1* | 10/2008 | Gross | G06F 11/3051 718/102 |
| 2008/0276234 | A1* | 11/2008 | Taylor | G06F 8/60 717/177 |
| 2009/0132999 | A1* | 5/2009 | Reyes | G06F 11/3668 717/124 |
| 2010/0031239 | A1* | 2/2010 | Keromytis | G06F 11/3688 717/128 |
| 2011/0126111 | A1* | 5/2011 | Gill | G06F 21/55 715/736 |
| 2012/0072985 | A1* | 3/2012 | Davne | H04L 63/0272 726/22 |
| 2012/0272205 | A1* | 10/2012 | Fox | G06F 8/36 717/101 |
| 2012/0311344 | A1* | 12/2012 | Sabin | G06F 9/45558 713/189 |
| 2012/0311534 | A1* | 12/2012 | Fox | G06F 8/36 717/120 |
| 2013/0311496 | A1* | 11/2013 | Fedorenko | G06F 8/71 707/758 |
| 2014/0026121 | A1* | 1/2014 | Jackson | G06F 9/44521 717/124 |
| 2014/0032449 | A1* | 1/2014 | Kacin | H04L 41/0883 706/12 |
| 2014/0033176 | A1* | 1/2014 | Rama | G06F 11/3688 717/124 |
| 2014/0149492 | A1* | 5/2014 | Ananthanarayanan | G06F 9/5072 709/203 |
| 2014/0173737 | A1* | 6/2014 | Toback | G06F 21/577 726/25 |
| 2014/0245376 | A1* | 8/2014 | Hibbert | H04L 63/1433 726/1 |
| 2014/0245460 | A1* | 8/2014 | Sum | G06F 21/577 726/28 |
| 2015/0100684 | A1* | 4/2015 | Maes | G06F 11/3672 709/224 |
| 2015/0106939 | A1* | 4/2015 | Lietz | G06F 21/577 726/25 |
| 2015/0180949 | A1* | 6/2015 | Maes | H04L 43/10 709/201 |
| 2015/0248558 | A1* | 9/2015 | Madou | G06F 21/577 726/25 |
| 2015/0264074 | A1* | 9/2015 | Mendelev | G06F 11/3672 726/25 |
| 2015/0269064 | A1* | 9/2015 | Bishop | G06F 11/3684 717/124 |
| 2016/0188885 | A1* | 6/2016 | Lee | G06F 21/577 726/25 |
| 2016/0248590 | A1* | 8/2016 | Benson | G06F 21/53 |
| 2016/0259636 | A1* | 9/2016 | Plate | G06F 8/658 |
| 2017/0034023 | A1* | 2/2017 | Nickolov | H04L 43/0817 |
| 2017/0104782 | A1* | 4/2017 | Folco | H04L 63/02 |
| 2017/0111384 | A1* | 4/2017 | Loureiro | H04L 63/1433 |
| 2017/0116421 | A1* | 4/2017 | M C | G06F 16/23 |
| 2017/0177860 | A1* | 6/2017 | Suarez | G06F 21/31 |
| 2017/0177877 | A1* | 6/2017 | Suarez | G06F 16/2455 |
| 2017/0180346 | A1* | 6/2017 | Suarez | G06F 9/45558 |
| 2017/0185783 | A1* | 6/2017 | Brucker | G06F 21/577 |
| 2017/0187743 | A1* | 6/2017 | Madou | G06F 21/566 |
| 2017/0286692 | A1* | 10/2017 | Nakajima | G06F 21/57 |
| 2018/0011700 | A1* | 1/2018 | Plate | G06F 8/65 |
| 2018/0027009 | A1* | 1/2018 | Santos | H04L 63/1433 726/25 |
| 2018/0114025 | A1* | 4/2018 | Cui | G06F 21/577 |
| 2018/0157842 | A1* | 6/2018 | Holz | G06F 16/338 |
| 2018/0205600 | A1* | 7/2018 | Burton | H04L 67/1097 |
| 2018/0225460 | A1* | 8/2018 | Nakajima | G06F 21/57 |
| 2019/0245894 | A1* | 8/2019 | Epple | G06F 21/56 |

OTHER PUBLICATIONS

Maliheh Monshizadeh et al., Patching Logic Vulnerabilities for Web Applications using LogicPatcher, Mar. 9-11, 2016, [Retrieved on Oct. 28, 2019]. Retrieved from the internet: <URL: https://dl.acm.org/citation.cfm?id=2857727> 12 Pages (73-84) (Year: 2016).*

DataSheet, Solarwinds "Patch Manager—Datasheet: Automated Patching of Microsoft Servers and 3rd-Party Apps," 2017, 6 Pages, Solarwinds Worldwide, LLC.

"Remote Windows Desktop Management and Desktop Administration Software—ManageEngine Desktop Central," 2018, 4 Pages, Zoho Corp., https://www.manageengine.com/products/desktop-central/features.html.

"What Are the Best SaaS Inventory and Patch Management Software Suites?" Mar. 24, 2016, 7 Pages, ITSlave.

"Comodo Creating Trust Online, Patch Management Comodo One," Patch Management Module Administrator Guide, 2017, 119 Pages, Software Version 3.3, Guide Version 2.2.032817, Comodo Security Solutions, Inc.

* cited by examiner

SYSTEMS AND METHODS FOR PATCHING VULNERABILITIES

BACKGROUND

Field of the Disclosure

The present disclosure generally relates to computing devices, and more particularly, to methods and systems for patching applications having security vulnerabilities, in various embodiments.

Related Art

More and more consumers are using computing devices to purchase items and services over electronic networks such as, for example, the Internet. Consumers routinely purchase products and services from merchants and individuals alike. The transactions may take place directly between a brick and mortar or on-line merchant and the consumer, and payment is typically made by entering credit card or other financial information. Transactions may also take place with the aid of an on-line or mobile payment service provider.

Such payment service providers can make transactions easier and safer for the parties involved. Purchasing with the assistance of a payment service provider from the convenience of virtually anywhere using a mobile device is one main reason why on-line and mobile purchases are growing very quickly. One challenging aspect to facilitating purchasing is the constant threat of security vulnerabilities in components of applications, which may have a multitude of negative effects on the payment service provider, its users, and merchants.

Thus, there is a need for an improved technique of detecting when an application has a vulnerability and patching or remedying that vulnerability.

Figure 1:
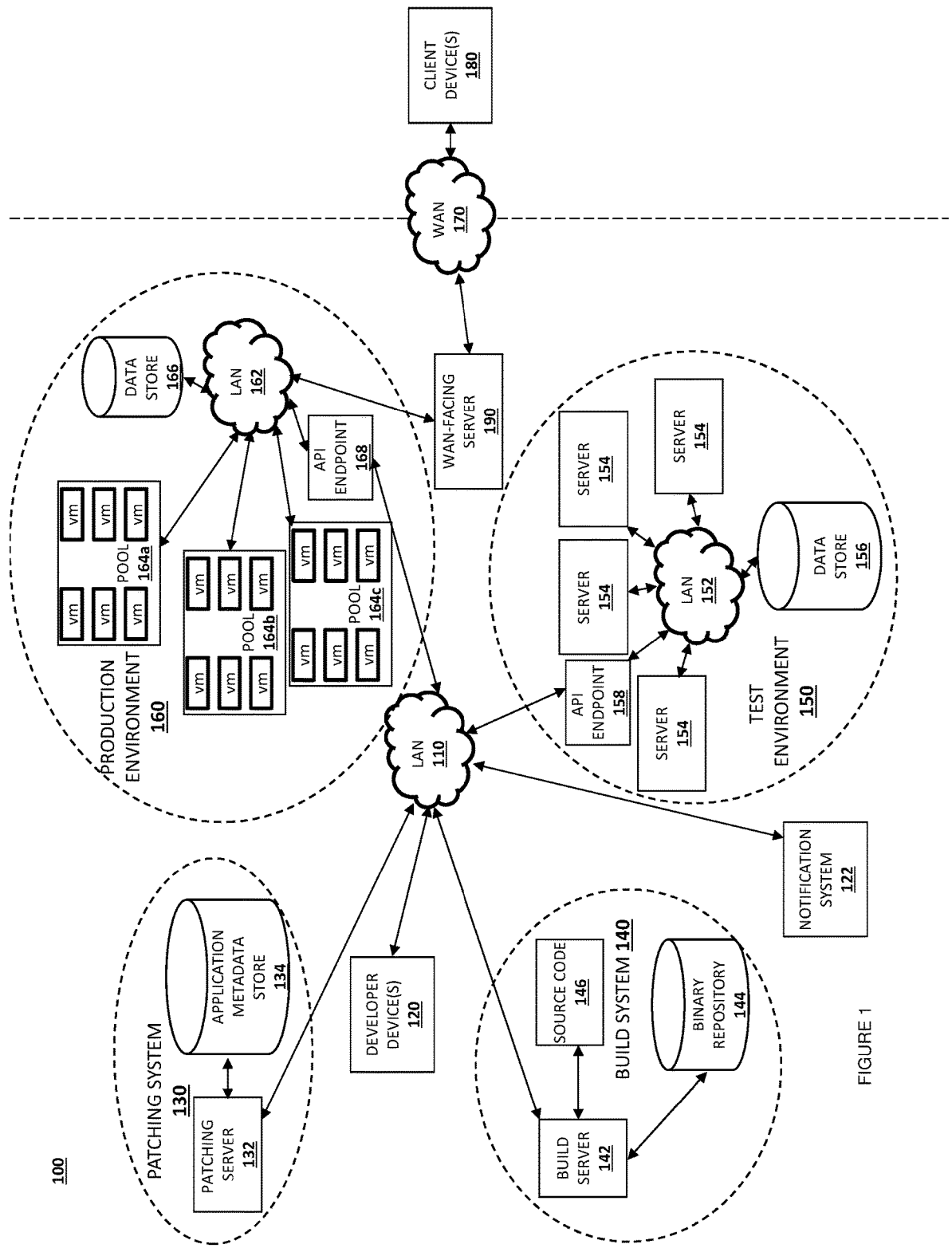
FIG. 1 is a schematic view illustrating an embodiment of a networked system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides, in different embodiments, systems and methods for providing, as an automated service, patching of applications containing components with security vulnerabilities. In response to receiving a notification that an element, such as a software component, of an application includes or exhibits a vulnerability, a database with metadata corresponding to a plurality of software applications is accessed to identify software applications that include, or depend upon, the component having the vulnerability. Using a build system, the identified software applications are cloned, and the version of the software component having the vulnerability within the software application is replaced in the cloned software applications. Using an application programming interface (API) of a cloud computing test environment, the cloned software applications are deployed onto the test environment. If the deployment is successful, the cloned software applications are deployed to a cloud computing production environment. In embodiments described herein, patching of applications occurs with little or no human involvement.

Modern software applications used by businesses and consumers often rely on multiple third-party components and software artifacts. For example, in a typical application used by a business, the application logic specific to the particular application may rely on a number of artifacts, or components, some of which are created by the business itself, or by third parties. Some components may be open source and freely available to the public. These components are often reusable across multiple applications for purposes such as standardized access to data sources, or interoperability with other applications. Thus, for example, components created by a business itself may be used throughout the business's applications to ensure that all applications can access and modify data stores according to standardized syntax. Third party or open source components may be used similarly, or may be used to implement security aspects of an application. Application logic may also utilize a runtime environment and an operating system for execution.

A potential problem with reliance on reusable software components as described above is that, at times, a software component may exhibit a newly-discovered vulnerability. Some vulnerabilities do not rise to a critical level; for example, the vulnerability may only affect the reliability or performance of an application which relies on the component. Other vulnerabilities, however, may be critical vulnerabilities. For example, vulnerabilities that can cause leaking of customer data are sometimes characterized as P0 or zero-day vulnerabilities that must be fixed immediately to eliminate, or lessen, undesired exposure of customer data (e.g., to malicious actors). Because a particular software component may be used in multiple applications, if a software component has a vulnerability, all of the applications which use the software component must be patched with a new version of the software component as soon as possible, to reduce the business's exposure. This may be a highly time consuming process, however, as it may require the involvement of multiple teams of software developers, testers, project managers, and the like. The longer a vulnerability is unpatched, the higher the risk to the business. Also, because many of the applications that use a particular software component having a vulnerability are business-critical, deploying a patch to a software component requires testing before a patched software component and an application including the patched software component are deployed to a production environment. In embodiments described herein, the security vulnerabilities are referred to as zero day or P0 vulnerabilities, but security vulnerabilities have varying levels of severity, and the embodiments described herein are equally applicable to all levels of severity.

Referring now to FIG. 1, an embodiment of a networked system 100 is illustrated. The networked system 100 includes a local area network 110, which in some embodiments is a local area network used within a business or other enterprise and which is not exposed to the Internet or another wide area network.

Coupled to local area network 110 are one or more developer devices 120, notification system 122, patching system 130, build system 140, test environment 150, and production environment 160, each of which is described in further detail below.

Developer devices 120 may be computing devices used by software developers within the business. The developer devices 120 may be implemented using any appropriate combination of hardware and/or software configured for wired and/or wireless communication over a network, such as local area network 110. For example, in one embodiment, the developer devices 120 may be implemented as a personal computer of a user, which may also be in communication with the Internet.

Notification system 122 may be a computing device which receives a notification of a vulnerability in a software component, and which also may transmit notifications to developers or other stakeholders regarding applications with vulnerabilities and remediation status of one or more applications.

Also coupled to local area network 110 is a patching system 130, in accordance with some embodiments. Patching system 130 may include a computing device, such as a patching server 132, which is coupled to an application metadata store 134. Application metadata store 134 may be directly connected to patching server 132, or may also be connected over a network, such as a local area network. Application metadata store 134 may store metadata for one or more applications used throughout a business, as well as information on software components used by each application and their associated versions. Application metadata store 134 may be, in some embodiments, a relational database or a non-relational database. Patching server 132, in some embodiments, accesses application metadata store 134 to determine one or more software applications having a particular version of a software component which has a vulnerability. In some embodiments, patching server 132 patches one or more applications used throughout the business, deploys applications to test and/or production environments, and controls testing of applications, as will be further discussed below.

Build system 140 may include a computing device, such as a build server 142, which is coupled to a binary repository 144. Binary repository 144 may be directly connected to build server 142, or may also be connected over a network, such as a local area network. Binary repository 144 may store binary images or compressed archives for one or more applications used throughout a business and track changes to those images or archives. Build server 142 may be utilized by one or more developers using developer devices 120 to create, modify, build, and store built binary images for applications used throughout a business, for example, based on source code 146.

Test environment 150, in some embodiments, may include a cloud computing test environment that emulates a cloud computing production environment. Test environment 150 includes a local area network 152, which may be a segment of local area network 110. Coupled to local area network 152 are a plurality of servers 154 which implement the cloud computing test environment. Also coupled to local area network 152 is a data store 156 that may store data associated with the cloud computing test environment. API endpoint 158 may serve as an access point for developers to access the functionality of cloud computing test environment 150, for example, to deploy applications to the cloud computing test environment 150 or to test applications executing on the cloud computing test environment 150. In one embodiment, multiple test environments 150 may be used. For example, a first test environment 150 may be based on a particular cloud platform, while a second test environment 150 may be based on another cloud platform. In one embodiment, each server 154 within test environment 150 hosts one or more virtual machines, upon which applications may be deployed and tested. Test environment 150 may also be known as a quality assurance environment.

Production environment 160 may be a cloud computing production environment that is used to deploy applications accessed by internal and external users. For example, production environment 160 may be a cloud computing production environment used to deploy applications accessed by users over the Internet. Production environment 160 includes a local area network 162, which may be a segment of local area network 110. Coupled to local area network 162 are a plurality of pools 164 (e.g., server pools) which implement the cloud computing production environment. Although three pools are depicted in FIG. 1, any number of pools may be used to deploy applications within the production environment. Also coupled to local area network 162 is a data store 166 that may store data associated with the cloud computing production environment. API endpoint 168 may serve as an access point for developers to access the functionality of cloud computing production environment 160, for example, to deploy applications to the cloud computing production environment 160. Like the test environments 150, in one embodiment, multiple production environments 160 may be used. For example, a first production environment 160 may be based on a particular cloud platform, while a second production environment 160 may be based on another cloud platform. In one embodiment, each pool 164 within production environment 160 may host a plurality of virtual machines. Each virtual machine within a pool may be used to deploy applications, as detailed herein. In one embodiment, one application is deployed to each virtual machine within a pool, and a different pool is used for each application deployed in the production environment. For example, pool 164a may be used to host a first application, whereas pool 164b may be used to host a different, second application.

Also coupled to local area network 162 is a wide area network-facing server 190. Wide area network-facing server 190 is itself coupled to a wide area network, such as wide area network 170, which in some embodiments may be the Internet. Wide area network-facing server 190 may be used to expose applications executing on cloud computing production environment 160 to end users, for example, end users using client devices 180. Applications executing on cloud computing production environment 160 may also be applications used internally to a business, in which case, such applications are not accessible through wide area network-facing server 190.

The networks 110, 152, 162, and 170 may be implemented as a single network or a combination of multiple networks. For example, in various embodiments, the networks 110, 152, 162, and 170 may include the Internet and/or one or more intranets, landline networks, local area networks, wide area networks, wireless networks, and/or other appropriate types of networks.

Figure 2:
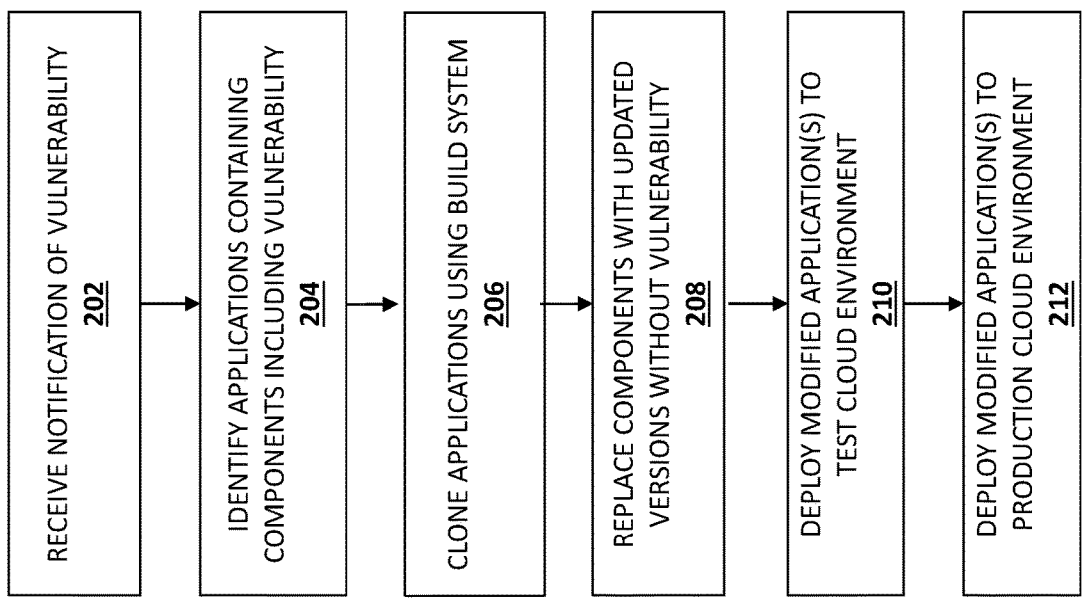
FIG. 2 is a flow chart illustrating an embodiment of a method for patching an application.

Referring now to FIG. 2, an embodiment of a method 200 for patching an application is illustrated. In the embodiments and examples discussed below, the application is described as an account access application that may provide access to a user's payment account, such as an application provided by a payment processing system. However, as described above, other examples of the application are also possible. For example, the application may be a data analysis application, or a web server application, or the like.

The method 200 begins at block 202 where a computing device, such as patching server 132 within patching system 130, receives a notification that a version of a software component contains a vulnerability. In one embodiment, the notification is received over a network, for example, from a notification system 122. In one embodiment, the notification includes an identification of a software component, and a version of the software component. The notification may also include a severity level of the vulnerability. For example, a vulnerability may refer to a CVE (Common Vulnerabilities and Exposures) number. A vulnerability may be defined (e.g., as defined by CVE itself) as a weakness in computational logic (e.g., code) found in software and hardware components that, when exploited, results in a negative impact to confidentiality, integrity, or availability. Mitigation of vulnerabilities in this context typically involves coding changes, but could also include specification changes or even specification deprecations (e.g., removal of affected protocols or functionality in their entirety).

In one embodiment, the patching server 132 may receive a notification that a software component contains a vulnerability based upon a user, such as a member of a security team (e.g., a security engineer or similar employee, but not necessarily the developer of the application), creating a patch using the patching server. For example, a security engineer may learn of a vulnerability, and create a patch which identifies the software component and version having the vulnerability. The security engineer may add content to the patch, for example, the newer version of the software component which is free of the vulnerability. In one embodiment, the content added to the patch includes a reference to the newer version of the software component to a location on a network. The format and syntax of the patch content may depend on the particular software component being replaced. In one embodiment, an application programming interface associated with the patching server 132 (e.g., a patching API) may be used to create the patch and add the patch content. In one embodiment, the patching API is a representational state transfer (REST) API. In some embodiments, although one software component may have a particular vulnerability, it may be dependent on another software component, and accordingly, multiple software components, and multiple newer versions of software components, (or references thereto) may be included in the patch. In one embodiment, a graphical user interface frontend for the patching application programming interface may be used to create one or more patches. In one embodiment, a patch may include a reference to a CVE number. In one embodiment, the patching server 132 may receive a notification that a software component contains a vulnerability based upon an automated or manual scan for vulnerabilities.

Figure 3A:
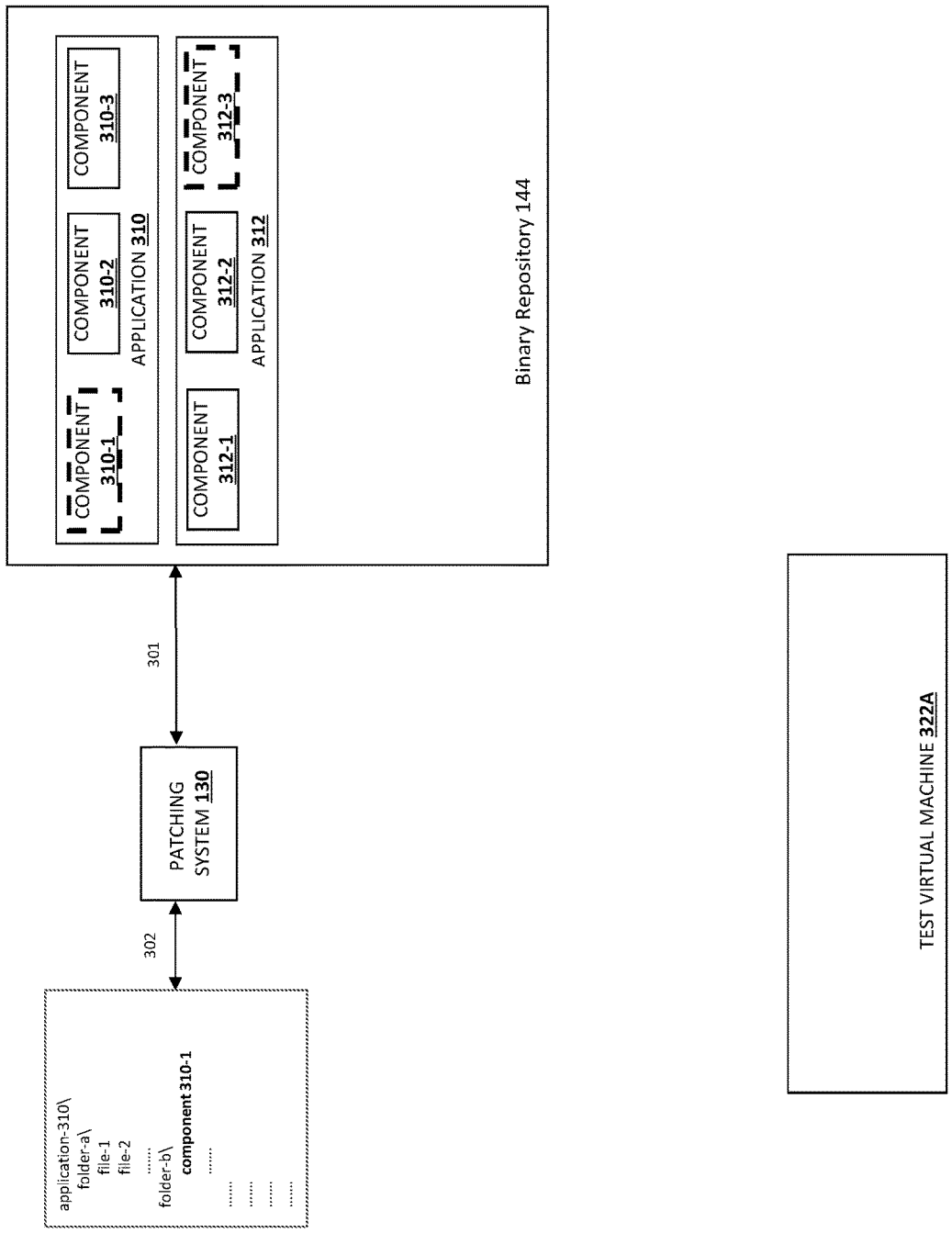
FIGS. 3a-3d are a time series of illustrations demonstrating an embodiment of a process of patching an application.

Method 200 then proceeds to block 204, where a database comprising metadata corresponding to a plurality of software applications is accessed to identify a list of one or more applications having the version of the software component that includes the vulnerability. In one embodiment, a device such as a patching server 132 of patching system 130 accesses the application metadata store 134 to identify the one or more applications having the version of the software component that includes the vulnerability. In one embodiment, developers responsible of the identified applications may be notified that their applications have vulnerabilities and are to be patched. For example, notification system 122 may transmit notifications using an issue tracking system to one or more developer devices 120. With reference to FIG. 3a, which depicts a patching system 130 and build repository 144, patching system 130 may identify (step 301) that an application such as application 310 has a component 310-1 which has a vulnerability (denoted by a dashed line around component 310-1). Patching system 130 may then decompress or extract the content of the application within a file system (e.g., a file system utilized by patching server 132), as shown in FIG. 3a's depiction of the structure of application 310 and the sub-folders contained within the application (step 302). FIG. 3a also depicts test virtual machine 322a, which may be a virtual machine hosted on a server 154 within test environment 150, as will be further explained below.

In one embodiment, during the development of a software application, the list of software components used by the software application, or upon which the software application depends, is determined by the patching server 132 and is stored in the application metadata store 134. For example, such a list may be determined at a build time of the application. In one embodiment, the patching system 130 recognizes the format of a particular type of application (e.g., a Docker container, or a NodeJS application, or the like), and may use references to the various components within the application to generate the list of software components upon which the application depends. In one embodiment, the patching system 130 can be extended to recognize additional application formats. Thus, at a later time, the metadata stored in the application metadata store 134 is accessed to determine whether a software application includes a version of a software component with a vulnerability. In one embodiment, the patching server 132 may block the build of a particular application, if a software component used in the application has a vulnerability, based on the collected metadata. In one example, building an application may include creating a containerized version of the application which can be executed using a container platform.

In one embodiment, if a software application does not have associated metadata stored in application metadata store 134, the software application may be scanned to identify constituent software components of the software application, and metadata corresponding to the software application and its constituent software components may be stored in the application metadata store 134. For example, the software application may be extracted from an archive to identify constituent software components and versions of those software components, which can be used when scanning for vulnerabilities discovered within those versions of the software components. That is, at a later time, as in the above example, the metadata stored in the application metadata store 134 is accessed to determine whether a software application includes a version of a software component with a vulnerability. A given software application may include a large number of software components upon which it depends.

In one embodiment, the list of identified software applications includes all of the applications which will be patched with a new version of the software component that does not have a vulnerability. In one embodiment, the list of identified applications having the version of the software component that includes the vulnerability is evaluated against a blacklist of software applications. For example, the blacklist of software applications may include a list of applications that should not be modified, for example, because any changes to the application may have unforeseen or unwanted effects. Thus, if one of the applications that was identified is on the blacklist, it may be removed from the list of identified applications that is to be patched. In one example, the software application that is used in the patching process may be part of the blacklist. Blacklists may also be software component-based; that is, certain software components themselves may not be eligible for replacement.

In one embodiment, a whitelist approach may be taken instead. That is, the list of identified software applications may be evaluated against a whitelist of software applications that identifies the software applications that are eligible for patching. If a software application on the originally-identified list is not present on the whitelist, it may be removed from the list of identified applications that is to be patched. Like the blacklist approach, whitelists may be software component-based.

Figure 3B:
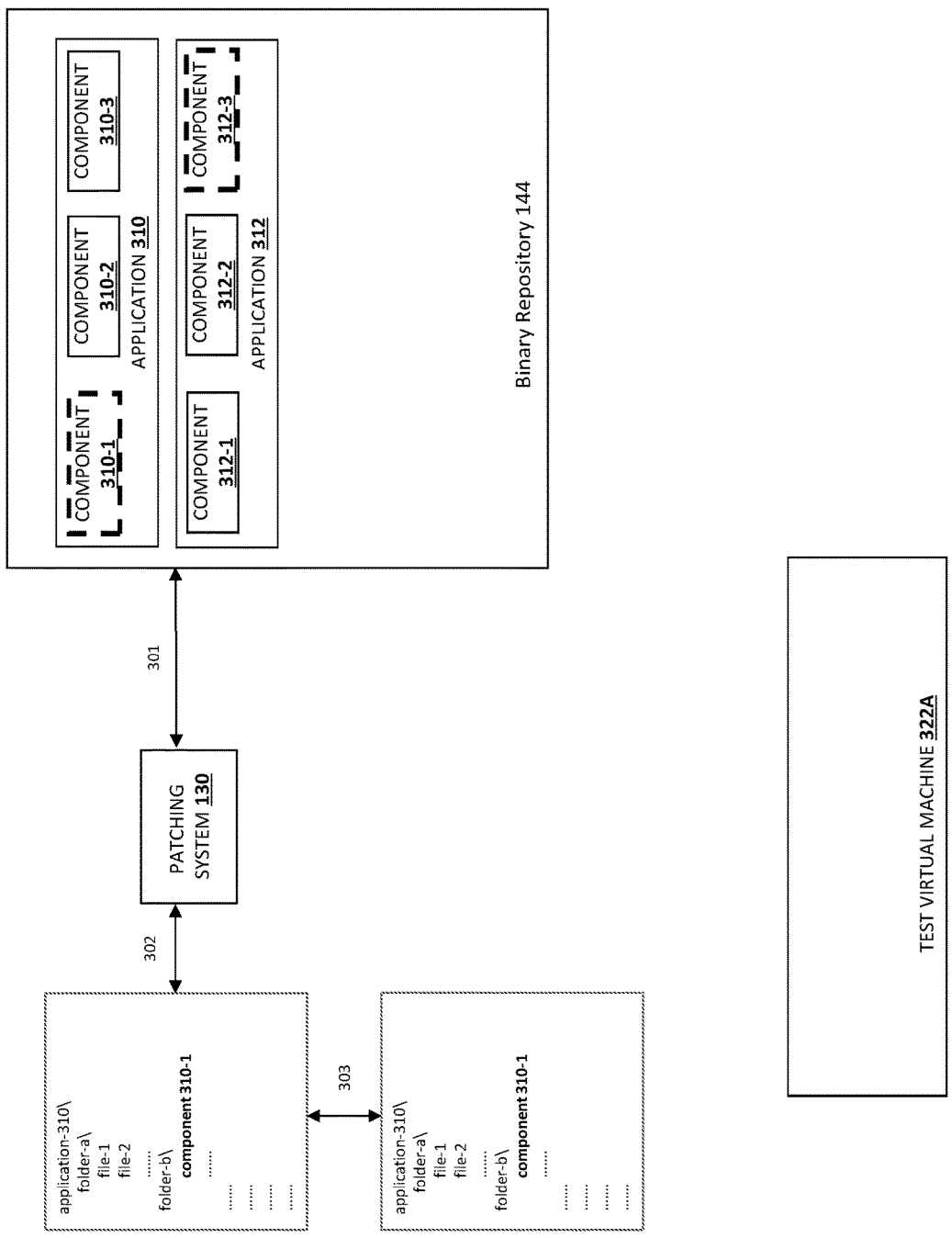

Method 200 then proceeds to block 206. At block 206, the applications having the software components which have the vulnerability are cloned. For example, the binary images for applications may be cloned using build server 142 in binary repository 144. In one embodiment, patching system 130 uses an application programming interface provided by build server 142 to clone the software applications containing the software components which have the vulnerability. In one embodiment, the applications that are cloned are only those that are not on a blacklist or are on a whitelist, when such approaches are used. Thus, as shown in FIG. 3b, application 310 is cloned, for example, within a file system used by patching system 130 (e.g., a file system utilized by patching server 132) (step 303).

Method 200 then proceeds to block 208. At block 208, in each of the cloned software applications, the version of the software component having the vulnerability is replaced with a new version not containing the vulnerability. To replace the software component, the patch content added to the patching server may be accessed to identify the version to be replaced and the new version, and the associated content for the new version of the software component. In one embodiment, a patching application programming interface may be used to replace the software component with a newer version. For example, a patching application programming interface may be used to access a patch repository which includes a record identifying the version of the software component containing the vulnerability, and the newer version of the software component without the vulnerability, as well as the actual code or binary information associated with the newer version of the software component, or a reference to the code or binary. Further, in one embodiment, replacing the software component with a newer version may include recognizing the format of the application containing the software component, and calling additional application programming interfaces to identify the particular structure of the application, such that the software component having the vulnerability can be removed and replaced with a newer version.

Figure 3C:
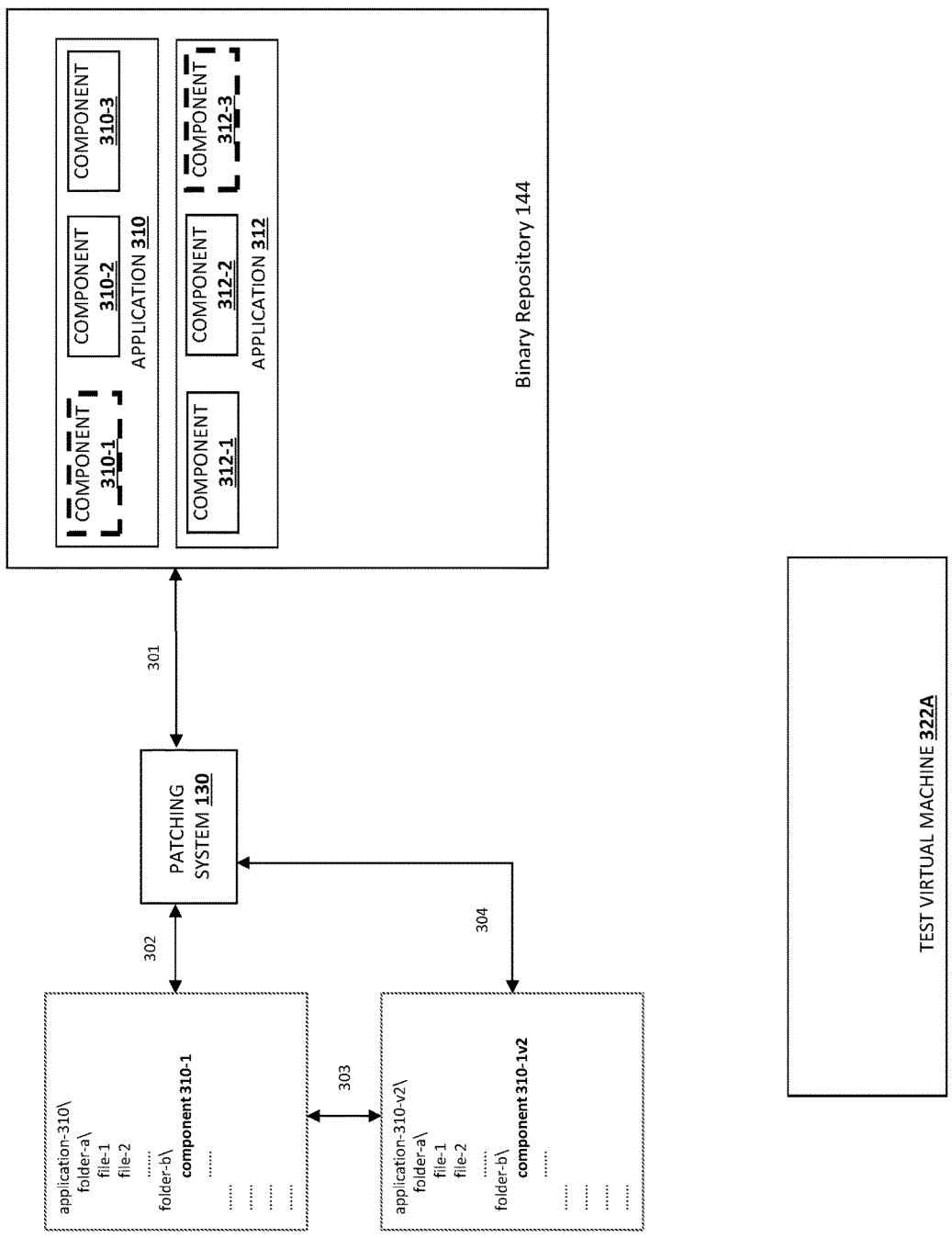
Figure 3D:
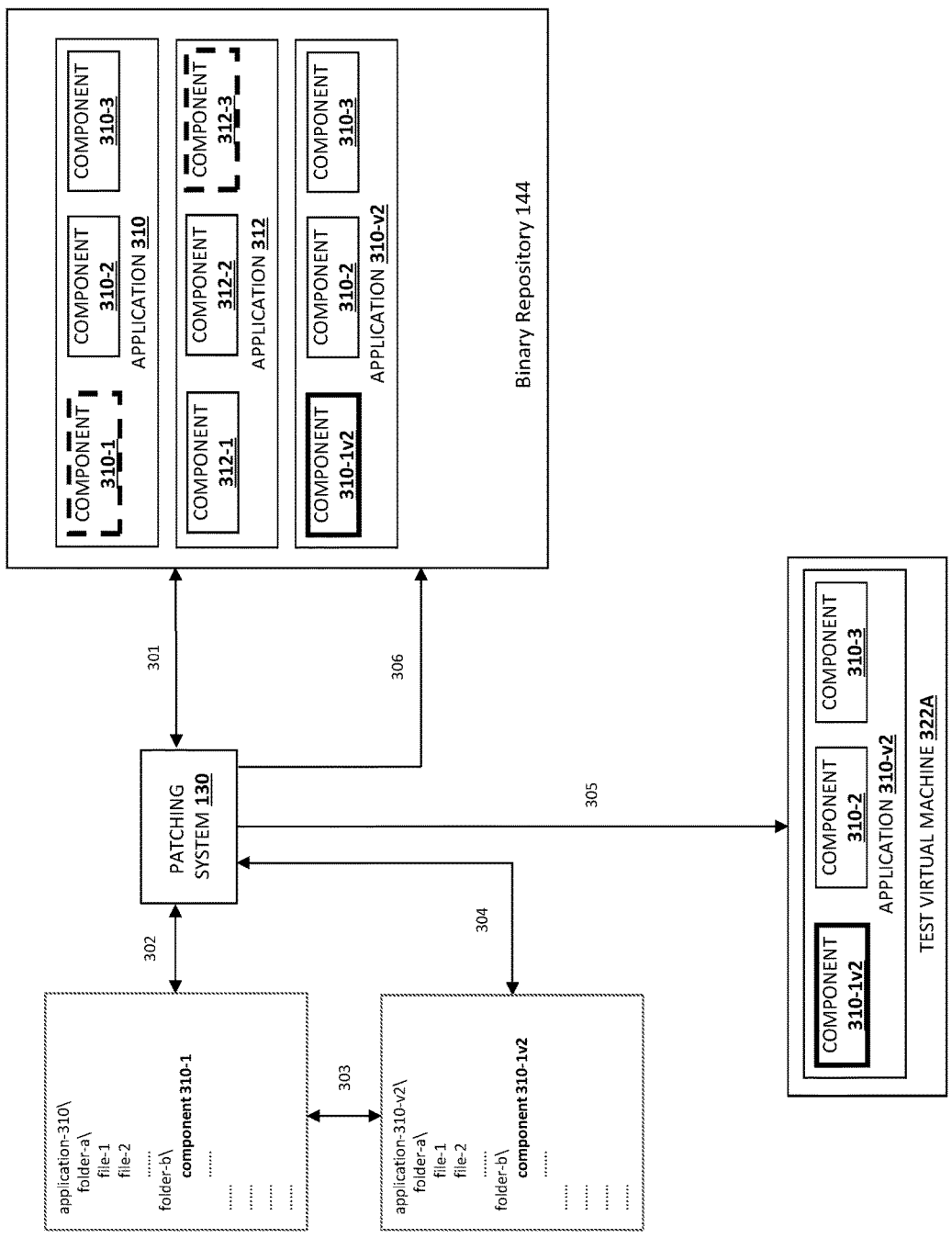

In one embodiment, replacing the software component includes decompressing the software application, removing the version of the software component having the vulnerability, adding the new version of the software component, and compressing the software application into an archive. Further, in one embodiment, the cloned software application with the new version of the software component may be committed to the build repository. In one embodiment, replacing the software component also includes building an image corresponding to the application with the new version of the software component. In one embodiment, the replacement process may use logic developed for a particular software application packaging method, so that the patching system 130 can recognize the format of the software application, replace the software component(s), and repackage the application according to its correct format. Thus, as one example, as shown in FIG. 3c, the patching system 130 may traverse the structure of application 310 to search for component 310-1 within application 310, and replace the component 310-1 with a second version, component 310-1v2 (step 304), without the vulnerability. In one embodiment, as described below, patching system 130 may recognize the particular structure of the application 310 to perform the search and replacement.

It is noted that, although the examples and embodiments described herein refer to a "newer" version as being a version of the software component without a vulnerability, the embodiments are not limited to such a situation. For example, it may be that a newer version of a software component has a vulnerability, but it is desirable to replace that newer version with an older version which does not have the vulnerability.

Method 200 then proceeds to block 210. At block 210, the cloned software applications, that is, the software applications which have had the software component replaced with a newer version without a vulnerability, are deployed to a cloud computing test environment. For example, the cloned software applications may be deployed to a virtual machine within cloud computing test environment 150. In one embodiment, an application programming interface associated with a cloud computing test environment may be used to deploy the cloned software applications on one or more virtual machines. In one embodiment, the cloned software applications are deployed to a cloud computing test environment that uses a particular cloud computing platform appropriate for a particular software application.

Once the patched cloned software applications are deployed to the cloud computing test environment, in one embodiment, each patched cloned software application is tested to ensure that the patched cloned software application exhibits its desired behavior. For example, tests are performed on the patched cloned software applications to ensure performance metrics are met, or that the vulnerability present in the previous version of the software component cannot be exploited, or that data input to the application results in an expected output, or the like. For example, automated unit tests may be run on the patched cloned applications executing on the virtual machines in the cloud computing test environment, or functional tests may be performed on the patched cloned software applications.

In one embodiment, deploying the patched cloned software applications to a cloud computing test environment may include building a containerized image corresponding to each patched cloned software application. For example, a containerized image may include the application code, software components upon which the application code relies, a runtime environment, and an operating system. Each of the aforementioned elements may correspond to a layer in a containerized image.

In one embodiment, testing and deploying the patched cloned software applications may also include building the application using a compressed archive and deploying the compressed archive to a virtual machine, such as a virtual machine hosted by a server 154 within test environment 150. In one embodiment, the patching system 130 recognizes the format of the particular application which has been patched, and builds the appropriate type of deployable build for deployment in production. For example, the patching system 130 can recognize that a particular application is to be deployed as a Docker image, based on its format or based on metadata, and builds the appropriate Docker image to be deployed. In one embodiment, the patching system 130 can be extended to support future types of deployable builds, based on the particular packaging format used by the build. Thus, as shown in FIG. 3c, patching system 130 may build a deployable build for application 310 having component 310-1v2 (i.e., application 310-v2), and deploy the build onto test virtual machine 322a (e.g., a virtual machine hosted on a server 154 in test environment 150) (step 305). Based on successful testing within test virtual machine 322a, the deployable build for application 310-v2 having component 310-1v2 is placed into the build repository 144 (step 306).

If the tests are successful, method 200 then proceeds to block 212. At block 212, based on a successful deployment of a patched cloned software application to the cloud computing test environment, the patched cloned software application is deployed to a cloud computing production environment. For example, the patched cloned software applications from build repository 144 may be deployed to a pool 164 within cloud computing production environment 160. In one embodiment, the pool 164 used to deploy a patched cloned software application is the same pool upon which the software application originally executed. In one embodiment, an application programming interface associated with a cloud computing production environment may be used to deploy the patched cloned software applications. In one embodiment, the application programming interface associated with the cloud computing test environment and cloud computing production environment may be similar. For example, the cloud computing test environment may be based on the same platform as the cloud computing production environment, so that the behavior of a cloned software application can be tested in a manner consistent with the application's real-world deployment. Similarly, the virtual machine within the cloud computing test environment may be similar to the virtual machines hosted by a pool, such as pool 164a within production environment 160. Thus, in one embodiment, the patched cloned software applications are deployed to server pools hosting one or more virtual machines, where each virtual machine hosts a respective patched cloned software application.

In one embodiment, the steps described above with respect to blocks 202-212 may be performed and available as a deployable service, and in some instances, without human intervention. For example, patching system 130 may provide patching-as-a-service, and may automatically receive notifications that versions of software components contain vulnerabilities, or may automatically receive notifications that a patch is available to a particular version of a software component. Then, the patching system 130 implementing method 200 may access a database of metadata, identify software applications, clone those software applications, replace the software component with a newer version, and deploy the patched cloned software application to the test and production environment, without relying on human intervention to execute each step. Thus, patching applications may be performed much more quickly and efficiently, which is advantageous particularly when P0 or zero-day vulnerabilities exist. Performing the steps described above with respect to blocks 202-212 may be part of a continuous integration and continuous delivery policy for development of software applications, which ensures that software changes are continuously integrated and auto-matically deployed to production once properly tested. Further, steps 202-212 may also be performed in parallel for multiple software applications, to efficiently address vulnerabilities across a high number of applications used in a business.

Figure 4A:
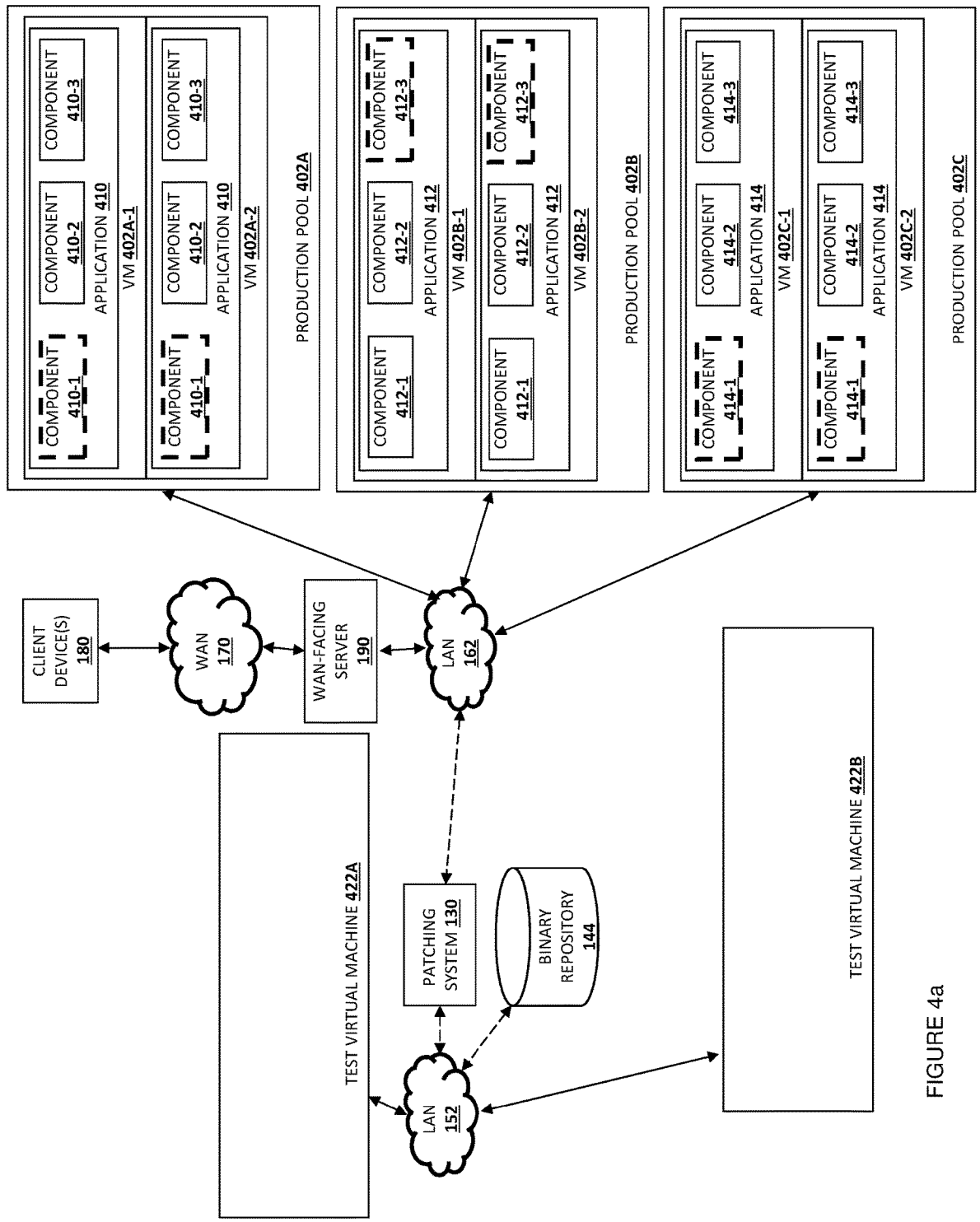
FIGS. 4a-4c are a time series of illustrations demonstrating an embodiment of a process of patching an application.
Figure 4B:
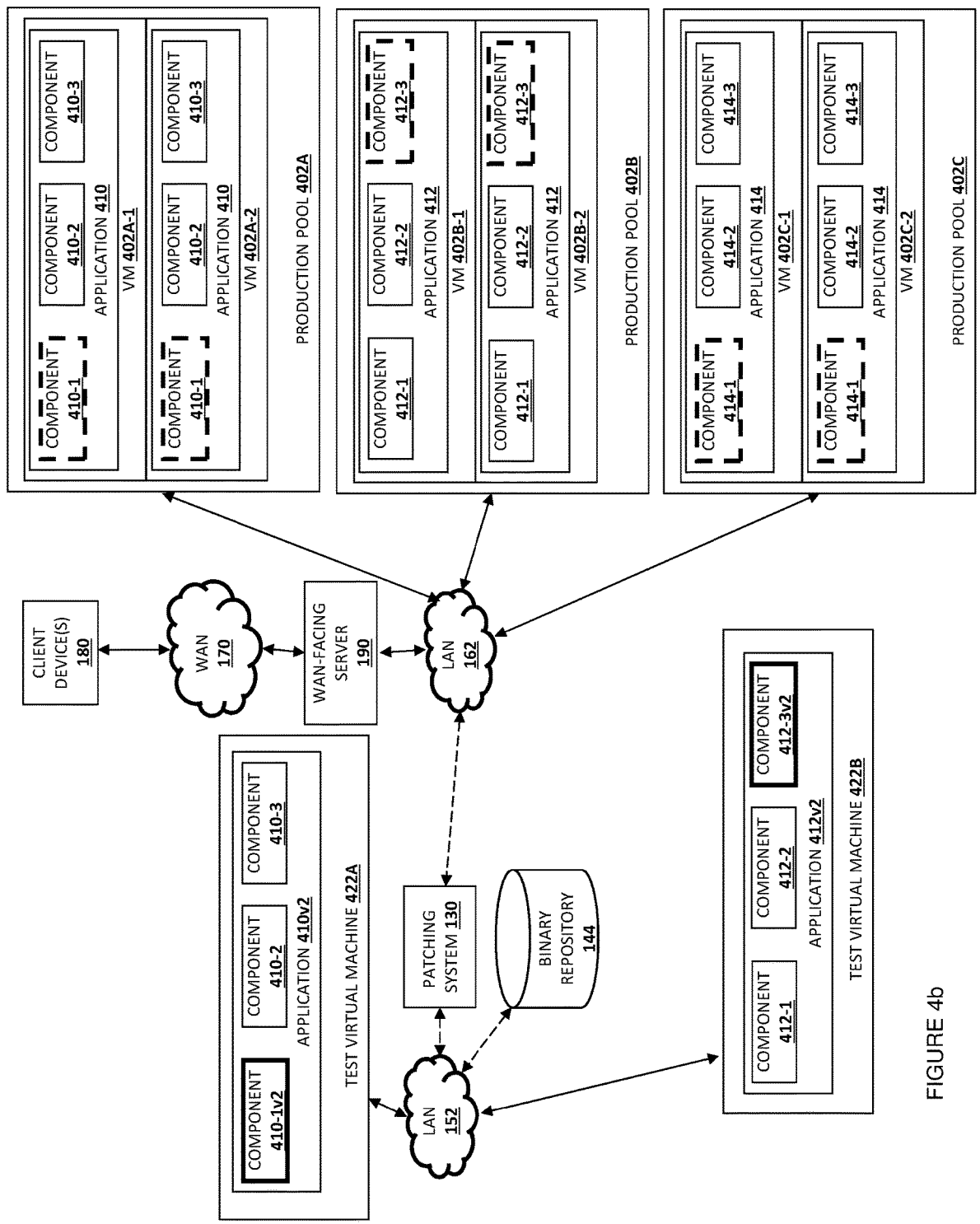
Figure 4C:
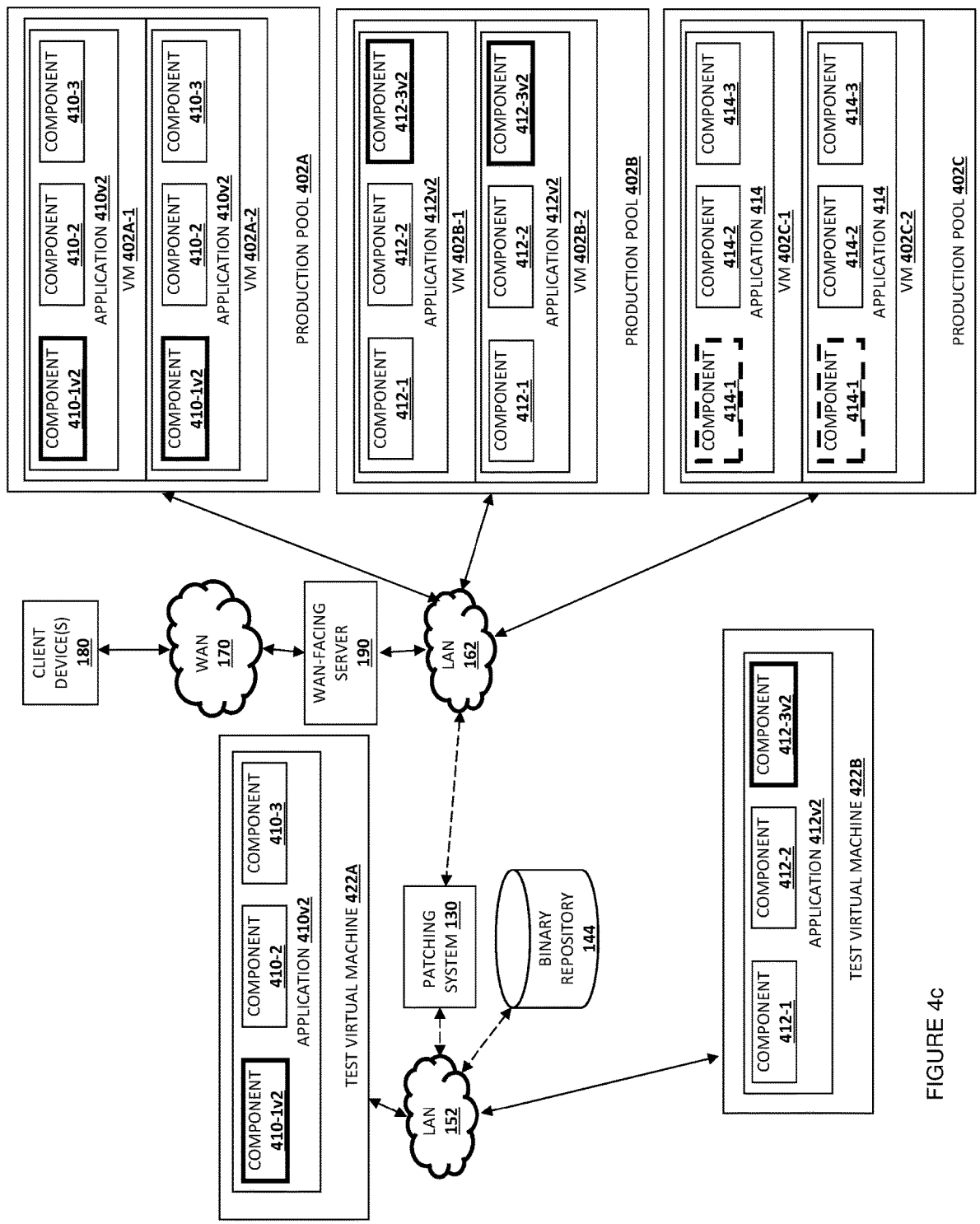

Further, the embodiments described herein may be consistent with a multi-phased approach to ensuring software is free from vulnerabilities. In a first phase, or an inventory phase, a list of software components which are part of a software application is compiled at build time and stored in a datastore (e.g., application metadata store 134). If an application is already built, it may be scanned for its constituent components. In a second phase, or an enforcement phase, the patching system 130 is notified of a vulnerability in a particular version of a software component, and enforces a policy that future builds of any application that rely on that software component are not permitted. In a third phase, or an automatic fixing or automatic patching phase, using the build data stored in application metadata store 134, live applications that have been built and deployed with newly discovered vulnerabilities in components are identified and patched with new version Referring now to FIGS. 4a-4c, a series of illustrative diagrams are depicted. The illustrative diagrams of FIGS. 4a-4c provide an example of events occurring on, and interactions between test environments (e.g., test virtual machines 422a, 422b), cloud computing production environments (e.g., production pools 402a, 402b, 402c), a patching system 130, binary repository 144, local area networks 152 and 162, and applications 410, 412, and 414, which each include multiple components. Test virtual machines 422a, 422b may be hosted on servers 154 within test environment 150 as shown in FIG. 1. Production pools 402a, 402b, 402c may be, for example, pools 164a, 164b, and 164c as shown in FIG. 1. As shown in FIG. 4a, application 410 may be deployed on a production pool 402a having two virtual machines 402a-1 and 402-a2, application 412 may be deployed on production pool 402b having two virtual machines 402b-1 and 402-b2, and application 414 is deployed on production pool 402c having two virtual machines 402c-1 and 402c-2. Each production pool 402 may have a greater or lesser number of virtual machines than depicted. Each of production pools 402a-402c may be part of a cloud computing production environment 160 as described previously. As also shown in FIG. 4a, applications 410, 412, and 414 each include three components. In the example of FIG. 4a, components 410-1, 412-3, and 414-1 may have an identified vulnerability, as denoted by the dashed bold line surrounding each component.

Accordingly, referring now to FIG. 4b, applications 410 and 412 may be cloned as described previously with reference to FIGS. 3a-3c, and had components 410-1 and 412-3 replaced with components 410-1v2 and 412-3v2, respectively. In the example of FIG. 4b, application 414 is on a blacklist, and therefore, application 414 was not cloned, and components (such as component 414-1) of application 414 were not replaced with newer versions. As described above, components may be on a blacklist, and thus, in one embodiment, component 414-1 itself may be on a blacklist, and therefore application 414 is not cloned (and therefore not updated with a new version of component 414-1). As shown in FIG. 4b, each of components 410-1 and 412-3 in the test virtual machines 422a, 422b are shown as being replaced with a newer version. That is, component 410-1 is shown as being replaced by component 410-1v2 and component 312-3 is shown as being replaced by component 412-3v2. The v2 (or version 2) components do not have the vulnerability of the originally-present components, and are therefore shown with a solid border. When the newer versioned components are deployed on the test virtual machines 422a and 422b in FIG. 4b, the applications 410v2 and 412v2 undergo testing (e.g., unit tests, integration testing, etc.) to ensure the operation of each application is according to expectations. Further, the applications 410v2 and 412v2 may undergo various validation methods to ensure they exhibit expected behavior. The applications 410v2 and 412v2 may also be placed (e.g., committed) to binary repository 144, as described previously.

Referring now to FIG. 4c, upon successful testing of the applications 410v2 and 412v2 with the newer v2 components, the applications 410v2 and 412v2 may be deployed, as described previously, to a production environment, for example, the production pools 402a and 402b. Thus, as shown in FIG. 4c, within each virtual machine 402a-1 and 402-a2 of production pool 402a, application 410 is updated to reflect the inclusion of component 410-1v2, and within each virtual machine 402b-1 and 402b-2 of production pool 402b, application 412 is updated to reflect the inclusion of component 412-3v2. As above, because application 414 is on a blacklist, it is not updated to reflect the inclusion of any updated components.

Figure 5:
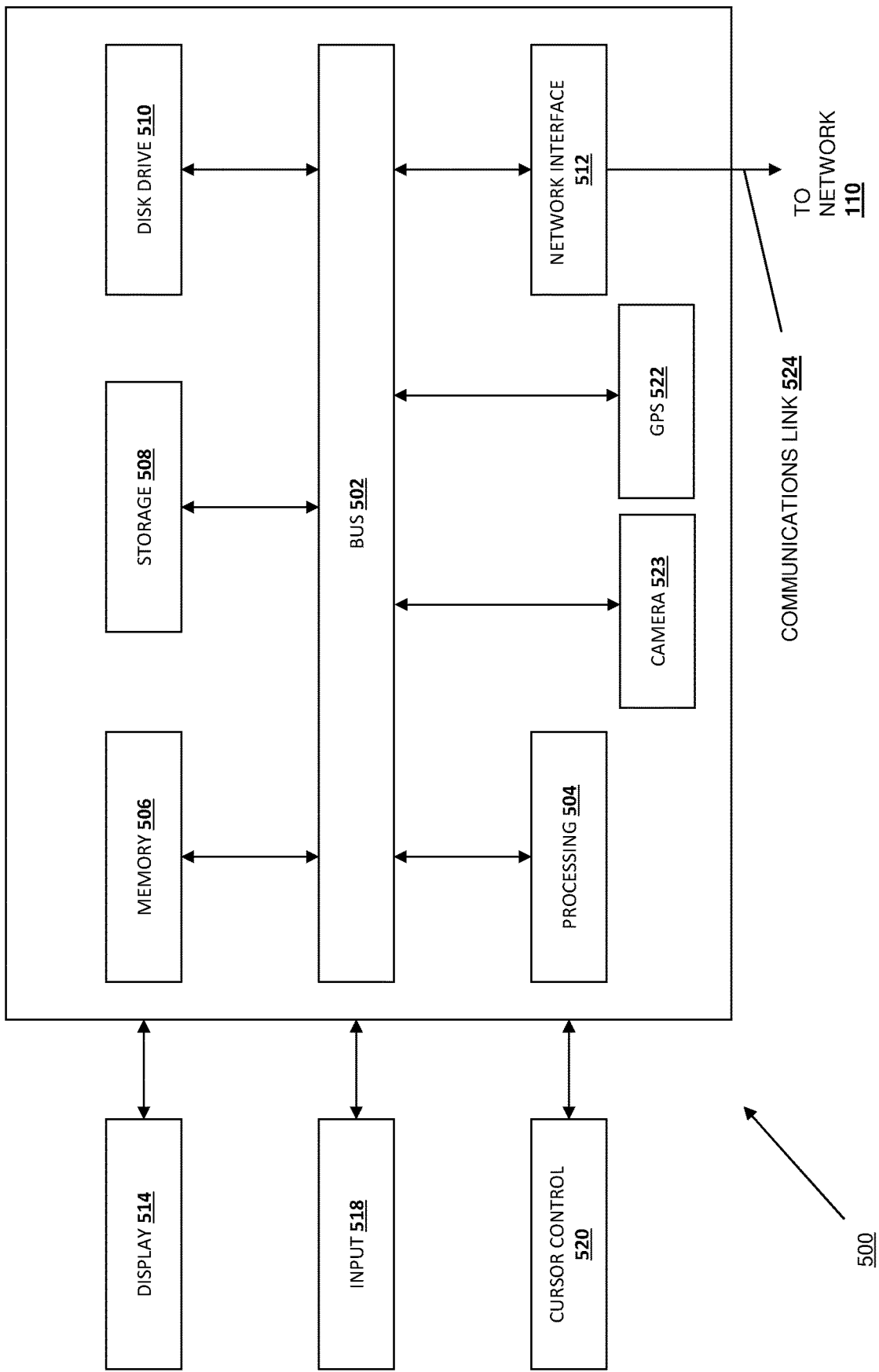
FIG. 5 is a schematic view illustrating an embodiment of a computing device.

Referring now to FIG. 5, an embodiment of a computer system 500 suitable for implementing, for example, the developer devices 120, patching server 132, build server 142, servers 154, API endpoint 158, pools 164, API endpoint 168, WAN-facing server 190, and client devices 180, is illustrated. It should be appreciated that other devices utilized in the system discussed above may be implemented as the computer system 500 in a manner as follows.

In accordance with various embodiments of the present disclosure, computer system 500, such as a computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), and/or a location determination component 522 (e.g., a Global Positioning System (GPS) device as illustrated, a cell tower triangulation device, and/or a variety of other location determination devices known in the art.) In one implementation, the disk drive component 510 may comprise a database having one or more disk drive components.

In accordance with embodiments of the present disclosure, the computer system 500 performs specific operations by the processing component 504 executing one or more sequences of instructions contained in the memory component 506, such as described herein with respect to the developer devices 120, patching server 132, build server 142, servers 154, API endpoint 158, servers 164, API endpoint 168, WAN-facing server 190, and/or client devices 180. Such instructions may be read into the system memory component 506 from another computer readable medium, such as the static storage component 508 or the disk drive component 510. In other embodiments, hard-wired circuitry may be used in place of or in combination with software instructions to implement the present disclosure.

Logic may be encoded in a computer readable medium, which may refer to any medium that participates in providing instructions to the processing component 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 500. In various other embodiments of the present disclosure, a plurality of the computer systems 500 coupled by a communication link 524 to networks 110, 152, 162, 170 (e.g., such as a LAN, WLAN, PTSN, and/or various other wired or wireless networks, including telecommunications, mobile, and cellular phone networks) may perform instruction sequences to practice the present disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processing component 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   receiving a notification that a first version of a software component contains a vulnerability;
   accessing a database comprising metadata corresponding to a plurality of software applications, the metadata comprising a mapping of each of the plurality of software applications to one or more of a plurality of software components and a mapping of each of the plurality of software components to a respective version number;
   identifying one or more software applications comprising the first version of the software component in the plurality of software applications having the first version of the software component using the accessed database;
   evaluating the one or more software applications against a blacklist of software applications;
   determining an indication that a first software application of the one or more software applications is included on the blacklist of software applications;
   removing the first software application from the one or more software applications;
   cloning, using a build system, remaining ones of the identified one or more software applications to generate one or more cloned software applications;
   replacing the first version of the software component containing the vulnerability in each of the cloned software applications with a second version of the software component, the second version of the software component not containing the vulnerability, wherein replacing the first version of the software component containing the vulnerability in each of the cloned software applications with the second version of the software component generates one or more patched software applications;
   deploying, using an application programming interface associated with a cloud computing test environment, each patched software application to the cloud computing test environment; and
   based on a successful deployment of each patched software application to the test environment, deploying each patched software application to a cloud computing production environment.

2. The method of claim 1, wherein replacing the first version of the software component in each cloned software application further comprises accessing, using a patching application programming interface, a patch repository, the patch repository comprising at least one record identifying the first version of the software component containing the vulnerability and the second version of the software component not containing the vulnerability.

3. The method of claim 1, further comprising committing each patched software application to the build system.

4. The method of claim 1, wherein the plurality of software applications is a first plurality of software applications, and wherein the method further comprises scanning a second plurality of one or more software applications to identify constituent software components of the one or more software applications in the second plurality; and storing metadata corresponding to the second plurality of software applications and their constituent software components in the database.

5. The method of claim 1,
   wherein
      removing the first software application from the first one or more software applications creates a second one or more software applications; and
      wherein the cloning and replacing are performed on the second one or more software applications.

6. The method of claim 1, further comprising:
   receiving a request to build a software application comprising a plurality of software components;
   generating metadata identifying each software component included in the software application, each software component having a version; and
   storing the generated metadata for the software application in a database.

7. The method of claim 1, wherein deploying each cloned software application to the cloud computing test environment further comprises building a containerized image corresponding to each cloned software application.

8. An automated vulnerability remediation system, comprising:
   a non-transitory memory; and
   one or more hardware processors coupled to the non-transitory memory and configured to read instructions from the non-transitory memory to cause the system to perform operations comprising:
      receiving a notification that a first version of a software component contains a vulnerability;
      accessing a database comprising metadata corresponding to a plurality of software applications, the metadata comprising a mapping of each of the plurality of software applications to one or more of a plurality of software components and a mapping of each of the software components to a respective version number;
      identifying a first software application comprising the first version of the software component in the plurality of software applications having the first version of the software component using the accessed database;
      evaluating the first software application and a second software application from the plurality of software applications against a blacklist of software applications;
      determining an indication that the second software application is included on the blacklist of software applications;
      removing the second software application from the plurality of software applications to create a second plurality of software applications;
      cloning, using a build system, remaining ones of the identified first software application to generate a cloned software application;
      replacing the first version of the software component containing the vulnerability in the cloned first software application with a second version of the software component to generate a patched first software application, the second version of the software component not containing the vulnerability;

deploying, using an application programming interface associated with a cloud computing test environment, the patched first software application to the cloud computing test environment; and based on a successful deployment of the cloned first software application to the test environment, deploying the patched first software application to a cloud computing production environment.

9. The system of claim 8, wherein replacing the first version of the software component in the cloned first software application further comprises accessing a patch repository, the patch repository comprising at least one record identifying the first version of the software component containing the vulnerability and the second version of the software component not containing the vulnerability.

10. The system of claim 8, wherein the operations further comprise committing the cloned first software application to the build system.

11. The system of claim 8, the operations further comprising:

scanning the second software application to identify constituent software components of the second software application; and storing metadata corresponding to the second software application and the constituent software components in the database.

12. The system of claim 8, wherein the cloning and the replacing are performed on the second plurality of software applications.

13. The system of claim 8, the operations further comprising:

receiving a request to build a software application comprising a plurality of software components;

generating metadata identifying a software component included in the software application, the software component having a version; and storing the generated metadata for the software application in the database.

14. The system of claim 8, wherein deploying the patched first software application to the cloud computing test environment further comprises building a containerized image corresponding to the patched first software application.

15. A non-transitory machine-readable medium having stored thereon machine-readable instructions executable to cause a machine to perform operations comprising:

responsive to a notification that a first version of a software component contains a vulnerability, identifying one or more software applications comprising the first version of the software component in a database comprising metadata corresponding to a plurality of software applications, each of the one or more software applications including the first version of the software component;

evaluating the first one or more software applications against a blacklist of software applications;

determining that an indication of a first software application of the first one or more software applications is included on the blacklist of software applications;

removing the first software application from the first one or more software applications;

cloning, using a build system, remaining ones of the identified one or more software applications to generate one or more cloned software applications;

replacing the first version of the software component containing the vulnerability in each cloned software application with a second version of the software component to generate one or more patched software applications, the second version of the software component not containing the vulnerability;

deploying, using an application programming interface associated with a cloud computing test environment, each patched software application to the cloud computing test environment; and based on a successful deployment of a first patched software application in the patched software applications to the test environment, deploying the first patched software application to a cloud computing production environment.

16. The non-transitory machine-readable medium of claim 15, wherein replacing the first version of the software component in each cloned software application further comprises accessing a patch repository, the patch repository comprising at least one record identifying the first version of the software component containing the vulnerability and the second version of the software component not containing the vulnerability.

17. The non-transitory machine-readable medium of claim 15, wherein the operations further comprise committing each patched software application to the build system.

18. The non-transitory machine-readable medium of claim 15, wherein the plurality of software applications is a first plurality of software applications, and the operations further comprising:

scanning a second plurality of one or more software applications to identify constituent software components of the one or more software applications in the second plurality; and storing metadata corresponding to the second plurality of software applications and their constituent software components in the database.

19. The non-transitory machine-readable medium of claim 15, the operations further comprising:

receiving a request to build a software application comprising a plurality of software components;

generating metadata identifying each software component included in the software application, each software component having a version; and storing the generated metadata for the software application in a database.

20. The non-transitory machine-readable medium of claim 15, wherein the blacklist comprises a list of applications where the first version of the software component is not eligible for replacement with the second version of the software component.

* * * * *

UNITED STATES PATENT AND TRADEMARK OFFICE
CERTIFICATE OF CORRECTION

PATENT NO. : 10,592,677 B2
APPLICATION NO. : 15/993338
DATED : March 17, 2020
INVENTOR(S) : Petratos et al.

Page 1 of 1

It is certified that error appears in the above-identified patent and that said Letters Patent is hereby corrected as shown below:

In the Claims

In Claim 5, Column 14, Line 14, change "application from the first" to --application from the--.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*